(12) United States Patent
Horiuchi

(10) Patent No.: US 8,869,852 B2
(45) Date of Patent: *Oct. 28, 2014

(54) RUN FLAT TIRE WITH SIDE REINFORCING LAYER, BEAD FILLER, AND SIDE FILLER

(75) Inventor: Kenji Horiuchi, Hiratsuka (JP)

(73) Assignee: The Yokohama Rubber Co., Ltd. (JP)

( * ) Notice: Subject to any disclaimer, the term of this patent is extended or adjusted under 35 U.S.C. 154(b) by 185 days.

This patent is subject to a terminal disclaimer.

(21) Appl. No.: 13/367,889

(22) Filed: Feb. 7, 2012

(65) Prior Publication Data

US 2013/0037193 A1 Feb. 14, 2013

(30) Foreign Application Priority Data

Feb. 9, 2011 (JP) ................................. 2011-026059

(51) Int. Cl.
| | |
|---|---|
| *B60C 17/00* | (2006.01) |
| *B60C 15/00* | (2006.01) |
| *B60C 15/06* | (2006.01) |
| *B60C 9/20* | (2006.01) |
| *B60C 9/22* | (2006.01) |
| *B60C 9/00* | (2006.01) |

(52) U.S. Cl.
CPC ............... *B60C 17/0009* (2013.04); *B60C 9/22* (2013.01); *B60C 15/06* (2013.01); *B60C 2015/0614* (2013.04); *B60C 15/0009* (2013.04); *B60C 15/0018* (2013.04); *B60C 15/0603* (2013.04); *B60C 17/0018* (2013.04); *B60C 9/005* (2013.04); *B60C 2017/0072* (2013.04); *B60C 2017/0063* (2013.04); *B60C 2013/045* (2013.04); *B60C 2013/006* (2013.04); *B60C 2013/007* (2013.04); *B60C 2006/2552* (2013.04)

USPC ........... 152/517; 152/527; 152/531; 152/547; 152/550; 152/554

(58) Field of Classification Search
USPC .................. 152/517, 527, 550, 554, 531, 547
See application file for complete search history.

(56) References Cited

U.S. PATENT DOCUMENTS

| | | | |
|---|---|---|---|
| 3,406,733 A * | 10/1968 | Boileau | |
| 2010/0147439 A1 * | 6/2010 | Koeune et al. | |
| 2011/0284143 A1 * | 11/2011 | Horiuchi | ....................... 152/517 |

FOREIGN PATENT DOCUMENTS

| | | |
|---|---|---|
| JP | H07-304312 | 11/1995 |
| JP | 2009-061866 | 3/2009 |

* cited by examiner

*Primary Examiner* — Adrienne C Johnstone
(74) *Attorney, Agent, or Firm* — Thorpe North & Western LLP

(57) ABSTRACT

A run flat tire with reinforced sides, wherein inner and outer rubber thickness ratios centered on a carcass layer in a side wall portion are stipulated and a side filler extending in the tire radial direction is embedded on the outer wall surface side of the side wall portion. In this run flat tire, the modulus of the side filler/modulus of a side reinforcing layer, the modulus of a rim cushion/a modulus of the side filler, the cross-sectional area of a bead filler/cross-sectional area of the side filler, the cross-sectional area of the side filler/cross-sectional area of the side reinforcing layer, the rubber hardness of the side reinforcing layer, and the material of belt cover layers are each stipulated.

11 Claims, 3 Drawing Sheets

RUN FLAT TIRE WITH SIDE REINFORCING LAYER, BEAD FILLER, AND SIDE FILLER

PRIORITY CLAIM

Priority is claimed to Japan Patent Application Serial No. 2011-026059 filed on Feb. 9, 2011.

BACKGROUND

1. Technical Field

The present technology relates to a run flat tire, and particularly relates to a run flat tire configured so as to have both durability when run-flat traveling and riding comfort when regular traveling.

2. Related Art

Generally, in run flat tires provided with a side reinforcing layer having a falcated cross-section on an inner surface side of a side wall portion, methods such as increasing a thickness of the side reinforcing layer and using a rubber with a high hardness have been used in order to ensure durability when run-flat traveling. However, when only these sorts of technologies are applied, there are problems in that the degree of excellent run-flat durability that can be ensured is limited and riding comfort when regular traveling is significantly worsened due to the increase in side wall stiffness.

Particularly, when the tire cross-sectional height reaches a certain height, breakdowns when run-flat traveling consist mainly of breakdowns in the vicinity of the rim cushion near the bead portion. Therefore, there is a demand for technology that prevents such breakdowns and, simultaneously, ensures excellent riding comfort.

Conventionally, technology has been proposed to solve this problem wherein a mitigating rubber layer is disposed in the vicinity of a rim line on an outer side, in a tire axial direction, of a folded up portion of a carcass layer, wherein, when a side wall portion buckles, the mitigating rubber layer exerts a mitigating action, with respect to the upthrust by a rim flange, between the carcass folded up edge portion and the rim flange in order to prevent rupturing in that area (e.g. see Japanese Unexamined Patent Application Publication No. H07-304312A). Additionally, technology has been proposed wherein a folded up end of a carcass layer is distanced from a region where it contacts a rim flange top edge portion in order to suppress the generation and/or expansion of cracking due to the concentration of stress in the vicinity of the folded up end of the carcass layer (e.g. see Japanese Unexamined Patent Application Publication No. 2009-61866A).

However, both of these proposals are limited as to effectiveness in enhancing run-flat durability, and, at the same time, do not directly lead to improvements in the effectiveness of enhancing riding comfort when regular traveling. Therefore, neither provides technology that can sufficiently satisfy the demand for both run-flat durability and riding comfort.

SUMMARY

The present technology provides a run flat tire configured so as to have both durability when run-flat traveling and riding comfort when regular traveling. The run flat tire of the present technology includes at least one layer of a carcass layer provided around bead cores embedded in a left-right pair of bead portions and folded over from a tire inner side toward a tire outer side so as to envelop bead fillers that are disposed on an outer circumferential side of the bead cores. In this run flat tire, a plurality of belt layers is disposed on an outer circumferential side of the carcass layer in a tread portion, a belt cover layer is disposed on the outer circumferential side of the belt layers, and a side reinforcing layer having a falcated cross-section is disposed between the carcass layer and an inner liner layer of the side wall portion. When Ga is a rubber thickness taken on a line normal to the rim line at an outer wall surface of the bead portion, between the carcass layer and an outer wall surface of the side wall portion, and Gb is a maximum rubber thickness taken on a line normal to the carcass layer between the carcass layer and the outer wall surface of the side wall portion, a relationship between Ga and Gb is $0.65Gb < Ga < 0.85Gb$. Furthermore, when Gc is a rubber thickness taken on a line normal to the rim line between the carcass layer and a tire inner wall surface, a relationship between Gc and Ga is $0.85Ga < Gc < 1.00Ga$. Moreover, a side filler is embedded in the outer wall surface side of the side wall portion, extending in a tire radial direction, having a maximum thickness at a position where the rubber thickness between the carcass layer and the outer wall surface of the side wall portion is greatest, and gradually thinning vertically in the tire radial direction.

In this run flat tire, a relationship between a 100% modulus Ms of the rubber forming the side filler and a 100% modulus M of the rubber forming the side reinforcing layer is such that $0.7M \leq Ms \leq 1.0M$; a relationship between a 100% modulus Mc of the rubber forming a rim cushion on the outer wall surface side of the bead portion and a 100% modulus Ms of the rubber forming the side filler is such that $0.7Ms \leq Mc \leq 1.3Ms$; a relationship between a cross-sectional area Df of the bead filler and a cross-sectional area Ds of the side filler is such that $Df \leq 0.4Ds$; and a relationship between the cross-sectional area Ds of the side filler and a cross-sectional area D of the side reinforcing layer is such that $0.2D \leq Ds \leq 0.6D$.

Also, the aforementioned configuration is preferably constituted as disclosed in (1) and/or (2) below.

(1) The side reinforcing layer having a falcated cross-section is formed from an inner side rubber and an outer side rubber that are connected in the tire radial direction. The inner side rubber of the rubber forming the side reinforcing layer has a higher JIS (Japanese Industrial Standards)-A hardness than the outer side rubber.

(2) The belt cover layer is composed of a composite fiber cord that is formed by twisting together a low elasticity yarn and a high elasticity yarn having differing elastic moduli.

According to the present technology, the relationship between the rubber thickness Ga, taken on the line normal to the rim line between the carcass layer and the outer wall surface of the side wall portion, and the maximum rubber thickness Gb, taken on the line normal to the carcass layer between the carcass layer and the outer wall surface of the side wall portion, is set within a predetermined range; and a ratio of variation in the rubber thickness in the tire radial direction on the outer side of the carcass layer is restricted. As a result, localized, concentrated stress caused by contact pressure with the rim is mitigated, which leads to separation breakdowns of the rubber near the rim cushion being suppressed when run-flat traveling. At the same time, rubber thickness in the upper region of the bead portion is ensured, whereby riding comfort when regular traveling can be enhanced.

Furthermore, a large rubber thickness Gc taken on the line normal to the rim line between the carcass layer and the tire inner wall surface is ensured, and the rubber thickness Gc is set so as to be close to the rubber thickness Ga described above. As a result, it is possible to relieve shearing stress acting between the main body side and the folded over side of the carcass layer, which leads to separation breakdowns therebetween being suppressed. Particularly, durability when run-flat traveling can be enhanced, and, at the same time, riding comfort when regular traveling can be enhanced due to rubber thickness being maintained in regions where great deformation occurs due to input from the rim.

Furthermore, a side filler is embedded in the outer wall surface side of the side wall portion, extending in a tire radial direction, having a maximum thickness at a position where the rubber thickness between the carcass layer and the outer wall surface of the side wall portion is greatest, and gradually thinning vertically in the tire radial direction. Additionally, a 100% modulus Ms of this rubber is set to a predetermined range with respect to a 100% modulus M of the rubber of the side reinforcing layer. Therefore, shearing stress received by the carcass layer can be suppressed particularly when run-flat traveling, while avoiding negative affects to riding comfort when regular traveling.

Additionally, a 100% modulus Mc of the rubber of the rim cushion on the outer wall side of the bead portion is set to a roughly equivalent predetermined range with respect to the 100% modulus Ms of the rubber of the side filler. Therefore, shearing stress received by the carcass layer can be more reliably suppressed particularly when run-flat traveling, while avoiding negative affects to riding comfort when regular traveling.

Furthermore, a cross-sectional area Ds of the side filler is set to a predetermined range with respect to a cross-sectional area Df of the bead filler and also to a predetermined range with respect to a cross-sectional area D of the side reinforcing layer. Therefore, riding comfort when regular traveling and durability when run-flat traveling can both be achieved at a high level.

DETAILED DESCRIPTION

Detailed descriptions will be given below of a structure of the present technology with reference to the accompanying drawings.

Figure 1:
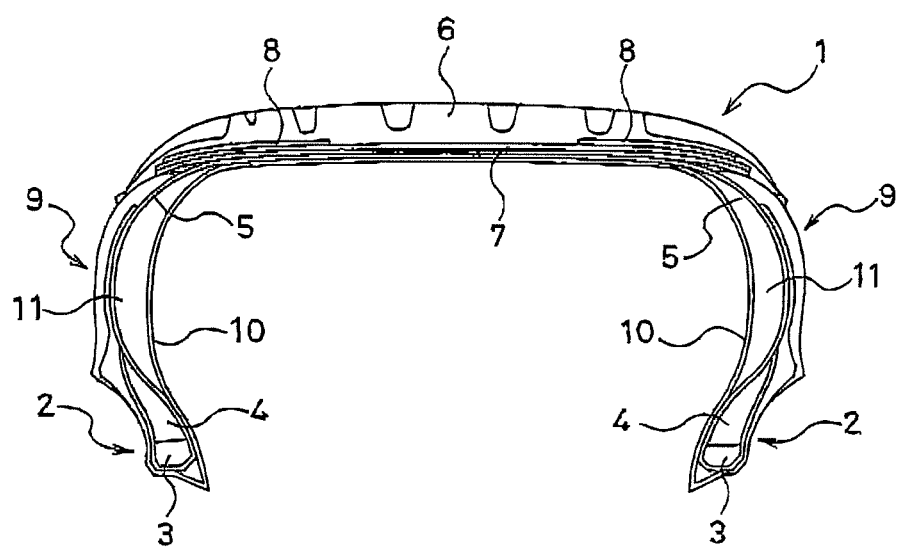
FIG. 1 is a cross-sectional view illustrating a structure of a run flat tire having a form in which a side reinforcing layer is disposed on an inner surface side of a side wall portion.

FIG. 1 is a cross-sectional view illustrating a construction of a run flat tire having a form in which a side reinforcing layer is disposed on an inner surface side of a side wall portion.

In FIG. 1, a run flat tire 1 includes at least one layer of a carcass layer 5 provided around bead cores 3,3 embedded in a left-right pair of bead portions 2,2 and folded over from a tire inner side toward a tire outer side so as to envelop bead fillers 4,4 that are disposed on an outer circumferential side of the bead cores 3,3, wherein a plurality of belt layers 7 are disposed on an outer circumferential side of the carcass layer 5 in a tread portion 6, a belt cover layer 8 is disposed on the outer circumferential side of the belt layers 7, and a side reinforcing layer 11 having a falcated cross-section is disposed between the carcass layer 5 and an inner liner layer 10 of side wall portions 9,9.

Figure 2:
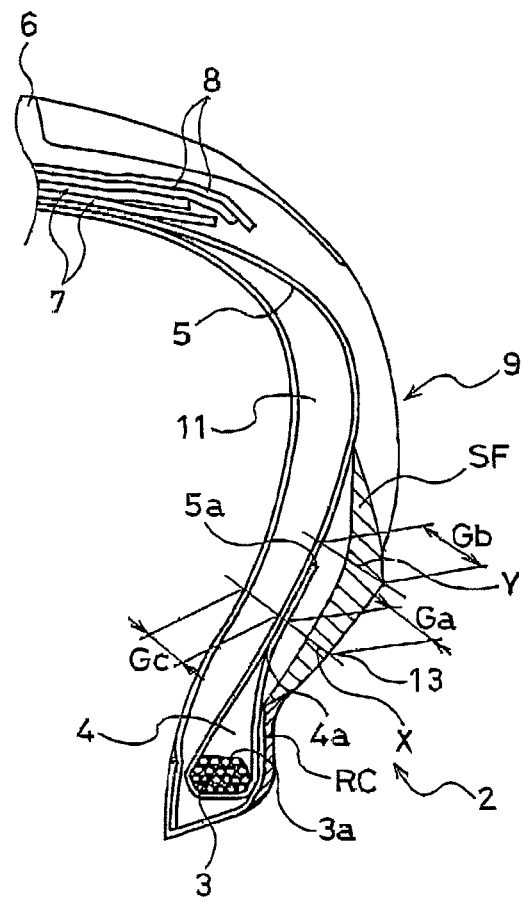
FIG. 2 is a cross-sectional view illustrating a structure of a side wall portion of the run flat tire according to an embodiment of the present technology.

Furthermore, in the present technology, as illustrated in FIG. 2, when Ga is a rubber thickness taken on the line X normal to a rim line 13 between the carcass layer 5 and an outer wall surface of the side wall portion 9 in the outer wall surface of the bead portion 2, and Gb is a maximum rubber thickness taken on a line normal to the carcass layer 5 between the carcass layer 5 and the outer wall surface of the side wall portion 9, a relationship between Ga and Gb is configured to be 0.65Gb<Ga<0.85Gb, and preferably 0.70Gb<Ga<0.80Gb. Note that in FIG. 2, Y is a line normal to the carcass layer 5 at a position where the rubber thickness between the carcass layer 5 and the outer wall surface of the side wall portion 9 is at a maximum.

Thus, the relationship between the rubber thickness Ga taken on the line X normal to the rim line 13 and the maximum rubber thickness Gb taken on the line normal to the carcass layer 5 is set and a ratio of variation in the rubber thickness in the tire radial direction on the outer side of the carcass layer 5 located in the upper region of the bead portion 2 is restricted. As a result, localized, concentrated stress caused by contact pressure with the rim is mitigated, which leads to separation breakdowns of the rubber near the rim cushion when run-flat traveling being suppressed. Therefore, run-flat durability can be enhanced. At the same time, the rubber thickness in the upper region of the bead portion 2 is ensured, whereby riding comfort when regular traveling can be improved.

Here, if the rubber thickness Ga taken on the line X normal to the rim line 13 is set so as to be 0.85 times or more of the maximum rubber thickness Gb taken along the line normal to the carcass layer 5, the form of the carcass line will not be maintainable and/or a gross volume of the rubber will become excessively large, leading to the durability being inhibited. Note that "rim line 13" described above refers to a thin line extending in a tire circumferential direction that is provided on the outer wall surface of the bead portion 2 so that the interlocked state of the tire and the rim can be externally determinable.

Furthermore, in the present technology, when Gc is a rubber thickness taken on the line X normal to the rim line 13 between the carcass layer 5 and a tire inner wall surface, a relationship between Gc and Ga is 0.85Ga<Gc<1.00Ga, and preferably 0.90Ga<Gc<0.95Ga.

Thus, a large rubber thickness Gc taken on the line X normal to the rim line 13 between the carcass layer 5 and the tire inner wall surface is ensured, and the rubber thickness Gc is set so as to be close to the rubber thickness Ga described above. As a result, it is possible to mitigate shearing stress acting between a main body side and the folded over side of the carcass layer 5, which leads to the suppression of separation breakdowns between the main body side and the folded over side of the carcass layer 5. Therefore, particularly, durability when run-flat traveling can be enhanced. At the same time, riding comfort when regular traveling can be enhanced due to rubber thickness being maintained in regions where great deformation occurs due to input from the rim.

Furthermore, a side filler SF, having a slightly high elastic modulus, is embedded in the outer wall surface side of the side wall portion 9, extending in a tire radial direction, having a maximum thickness at a position where the rubber thickness between the carcass layer 5 and the outer wall surface of the side wall portion 9 is greatest, and gradually thinning vertically in the tire radial direction. A 100% modulus Ms of the rubber forming the side filler SF is configured so as to be from 0.7 to 1.0 times a 100% modulus M of the rubber forming the side reinforcing layer 11.

As a result of embedding the side filler SF in the outer wall surface of the side wall portion 9 having a thickness that is varied in the tire radial direction, shearing stress received by the carcass layer 5 can be effectively suppressed particularly when run-flat traveling, while avoiding negative affects to riding comfort when regular traveling. If the modulus Ms of the rubber forming the side filler SF is less than 0.7 times the modulus M of the rubber forming the side reinforcing layer 11, the shearing stress received by the carcass layer 5 will become excessively great and durability will decline. If the modulus Ms of the rubber forming the side filler SF exceeds 1.0 times the modulus M of the rubber forming the side reinforcing layer 11, the longitudinal blade constant will increase and riding comfort will decrease.

In the present technology, "100% modulus" refers to tensile stress at 100% elongation when measured in accordance with JIS (Japanese Industrial Standards) K6251 at 23° C. The same definition applies hereinafter as well.

Furthermore, in the present technology, a 100% modulus Mc of the rubber forming a rim cushion RC on the outer wall surface side of the bead portion 2 is configured so as to be from 0.7 to 1.3 times the 100% modulus Ms of the rubber forming the side filler SF.

Thus, the 100% modulus Mc of the rubber forming the rim cushion RC is set to a roughly equivalent predetermined range with respect to the 100% modulus Ms of the rubber of the side filler. Therefore, shearing stress received by the carcass layer can be more reliably suppressed particularly when run-flat traveling, while avoiding negative affects to riding comfort when regular traveling. If the modulus Mc of the rubber forming the rim cushion RC is less than 0.7 times the modulus Ms of the rubber forming the side filler SF, the shearing stress received by the carcass layer 5 will become excessively great and durability will decline. If the modulus Mc of the rubber forming the rim cushion RC exceeds 1.3 times the modulus Ms of the rubber forming the side filler SF, the longitudinal blade constant will increase and riding comfort will decrease.

Furthermore, in the present technology, a cross-sectional area Df of the bead filler 4 is configured so as to be not more than 0.4 times a cross-sectional area Ds of the side filler SF, and the cross-sectional area Ds of the side filler SF is configured so as to be from 0.2 to 0.6 times a cross-sectional area D of the side reinforcing layer 11.

Thereby, it is possible to achieve high levels of both durability when run-flat traveling and riding comfort when regular traveling. If the relationship between the cross-sectional area Df of the bead filler 4 and the cross-sectional area Ds of the side filler SF, and the relationship between the cross-sectional area Ds of the side filler SF and the cross-sectional area D of the side reinforcing layer 11 are outside the ranges described above, stress balance throughout an entirety of the tire will collapse, causing a decline in durability and, at the same time, longitudinal blade constant will increase, causing a decline in riding comfort.

In the present technology, a position of a folded up end 5a of the carcass layer 5 is not particularly limited but, preferably, as illustrated in FIG. 2, the position of the folded up end 5a of the carcass layer 5 is disposed at the position between the carcass layer 5 and the outer wall surface of the side wall portion 9 where the rubber thickness is greatest. Therefore, separation breakdowns from the folded up end 5a of the carcass layer 5 are suppressed and, particularly, durability when run-flat traveling can be enhanced.

Additionally, a position of an outer peripheral edge 4a of the bead filler 4 is not particularly limited but, preferably, as illustrated in FIG. 2, is disposed inward in the tire radial direction of a line X normal to a rim line 13 of an outer wall surface of the bead portion 2. Therefore, the outer peripheral edge 4a of the bead filler 4 is distanced from the region prone to being subjected to the large amount of stress caused by contact pressure with the rim when run-flat traveling. Thus, shearing stress acting on the outer peripheral edge 4a of the bead filler 4 can be suppressed, and run-flat durability can be enhanced due to separation of the rubber in this area being suppressed.

Figure 3:
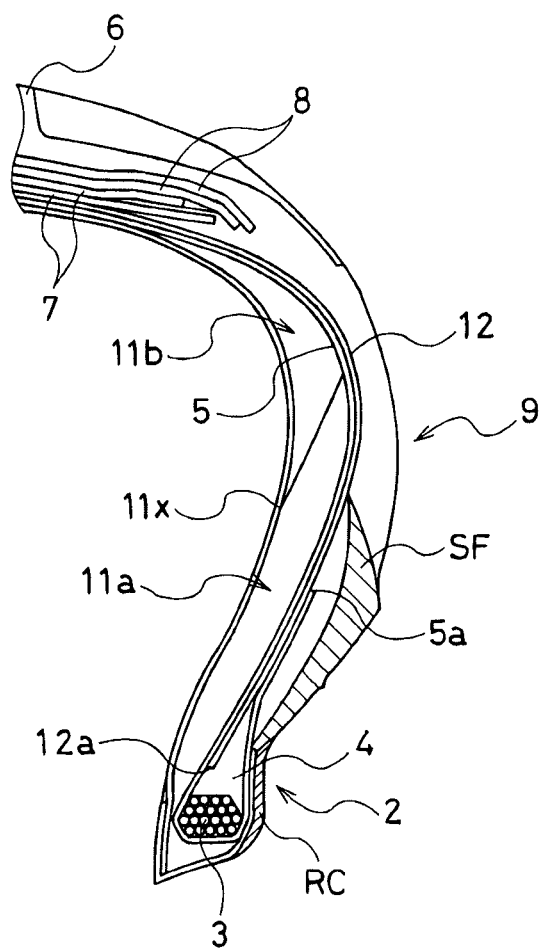
FIG. 3 is a cross-sectional view illustrating a structure of a side wall portion of the run flat tire according to another embodiment of the present technology.

FIG. 3 is a cross-sectional view illustrating a structure of a side wall portion 9 of the run flat tire 1 according to another embodiment of the present technology. In this embodiment, in order to increase the stiffness in the crown portion, a second carcass layer 12 is disposed on the outer circumferential side of the carcass layer 5 in the width direction of the tread portion 6, and an end 12a of the second carcass layer 12 is positioned on the tire inner wall surface side of the bead filler 4.

Thus, the second carcass layer 12 having the end 12a that does not reach the outer peripheral surface 3a of the bead core 3 is disposed along the outer peripheral surface of the carcass layer 5. Therefore, the second carcass layer 12, which is freed from shearing strain caused by tension applied to the carcass layer 5, enhances the stiffness of a crown portion. This results in excellent steering stability and riding comfort being displayed when regular traveling. Furthermore, this also results in suppressing buckling of the tread portion 6 when run-flat traveling, whereby run-flat durability can be further enhanced while ensuring excellent steering stability and riding comfort.

In the present technology, as illustrated in FIG. 3, the side reinforcing layer 11 described above is more preferably formed from an inner side rubber 11a and an outer side rubber 11b that are continuous in the tire radial direction, and the inner side rubber 11a of the rubber forming the side reinforcing layer preferably has a higher JIS-A hardness than that of the outer side rubber 11b. Thereby, a soft rubber is disposed on the tread portion 6 side, resulting in the rubber in the vicinity of the shoulder being deformable, which leads to a reduction in the stress received from the rim and makes possible the further enhancement of riding comfort when regular traveling. In the present technology, a relationship between the 100% modulus Ms and the 100% modulus Mi of the inner side rubber 11a is such that $0.7\text{Mi} \leq \text{Ms} \leq 1.0\text{Mi}$ and a relationship between Ms and the 100% modulus Mo of the outer side rubber 11b is such that $0.7\text{Mo} \leq \text{Ms} \leq 1.0\text{Mo}$.

In the present technology, the belt cover layer 8 more preferably is composed of a composite fiber cord that is formed by twisting together a low elasticity yarn and a high elasticity yarn having different elastic moduli. By using the composite fiber cord, which is formed by twisting a low elasticity yarn and a high elasticity yarn together, as the belt cover layer 8, the drawbacks of low elasticity fiber cords (recoverability of distortions being difficult to obtain due to high heat generation), and the drawbacks of high elasticity cords (slightly problematic compression fatigue and adhesiveness) can be mutually compensated for.

Moreover, by appropriately selecting the type and physical properties of the composite fiber cord, stiffness in the crown portion is ensured, which leads to excellent steering stability and riding comfort being displayed when regular traveling and also makes possible the enhancing of run-flat durability by suppressing buckling of the tread portion 6 when run-flat traveling.

As described above, with the run flat tire of the present technology, the relationship between the thicknesses of the inner and outer rubber, centered on the carcass layer in the side wall portion is stipulated, and the side filler extending in the tire radial direction is embedded on the outer wall surface side of the side wall portion. Moreover, the relationship between the modulus of the side filler and the modulus of the side reinforcing layer, the relationship between the modulus of the rim cushion and the modulus of the side filler, the relationship between the cross-sectional area of the bead filler and the cross-sectional area of the side filler, and the relationship between the cross-sectional area of the side filler and the cross-sectional area of the side reinforcing layer are each stipulated. Therefore, riding comfort and run-flat durability can both be achieved at a high level and, thus, the run flat tire of the present technology can be widely applied as a run flat tire for mounting on modern, high-performance vehicles.

EXAMPLES

Conventional Example, Working Examples 1 to 4, and Comparative Examples 1 and 2

A conventional tire (Comparative Example), present technology tires (Working Examples 1 to 4), and comparative tires (Comparative Examples 1 and 2) were fabricated having a common tire size of 245/45R17 and the basic structure of the left and right side wall portions as illustrated in FIG. 2. Rubber thickness ratios in the side wall portion 9 (Ga/Gb and Gc/Ga), 100% modulus Ms of the side filler/100% modulus M of the side reinforcing layer, 100% modulus Mc of the rim cushion/100% modulus Ms of the side filler, cross-sectional area Df of the bead filler/cross-sectional area Ds of the side filler, cross-sectional area Ds of the side filler/cross-sectional area D of the side reinforcing layer, the JIS-A rubber hardness of the side reinforcing layer, and the material of the belt cover layers were each varied as shown in Table 1.

Note that in Table 1, the 100% modulus of each of the constituents is abbreviated as "modulus". Additionally, in each of the tires, rayon fiber cord was used for each carcass layer 5, steel cord was used for each belt layer 7, and rubber having a JIS-A hardness of 80 was used for each bead filler 4.

These seven types of tires were each mounted on the front and rear wheels of a front-engine front-wheel drive (FF) vehicle having an engine displacement of 1,800 cc. Run-flat durability and riding comfort were evaluated via the test methods described below.

Run-Flat Durability

Each tire was assembled on a rim (size: 17×8.0J) and inflated to an air pressure of 230 kPa. The valve core of the right side drive axle tire (one of the four tires) was removed and the vehicle was run on an asphalt road surface test course at an average speed of 80 km/h. Running was continued until the driver felt vibration caused by the breakdown of the tire. Run-flat durability was evaluated based on the average running distance. Three experienced test drivers performed this evaluation and the results were averaged and recorded in Table 1 as index values with the value of the conventional tire being 100. Larger index values indicate superior run-flat durability.

Riding Comfort

Each tire was assembled on a rim (size: 17×8.0J) and inflated to an air pressure of 230 kPa. The vehicle was run on a dry asphalt road surface test course at an average speed of 80 km/h and three experienced test drivers performed a sensory evaluation. The results of the evaluations were tallied on a 5-point scoring scale with the score of the conventional tire being 3, and the average score thereof was recorded in Table 1. Larger index values indicate superior riding comfort.

TABLE 1

|  |  | Conv. Ex. | W.E. 1 | W.E. 2 | W.E. 3 | W.E. 4 | C.E. 1 | C.E. 2 |
|---|---|---|---|---|---|---|---|---|
| Rubber thickness ratio (Ga/Gb) | | 0.50 | 0.75 | 0.75 | 0.75 | 0.75 | 0.75 | 0.75 |
| Rubber thickness ratio (Gc/Ga) | | 0.50 | 0.90 | 0.90 | 0.90 | 0.90 | 0.90 | 0.90 |
| Modulus ratio (Ms/M) | | — | 0.85 | 0.85 | 0.85 | 0.85 | 1.20 | 0.85 |
| Modulus ratio (Mc/Ms) | | — | 1.00 | 1.00 | 1.00 | 1.00 | 1.00 | 1.00 |
| Cross-sectional area ratio (Df/Ds) | | — | 0.30 | 0.30 | 0.30 | 0.30 | 0.30 | 0.60 |
| Cross-sectional area ratio (Ds/D) | | — | 0.40 | 0.40 | 0.40 | 0.40 | 0.40 | 0.80 |
| JIS-A rubber hardness of the side reinforcing layer | Inner side rubber | 72 | 72 | 75 | 65 | 75 | 72 | 72 |
|  | Outer side rubber | 72 | 72 | 65 | 75 | 65 | 72 | 72 |
| Material of the belt cover layers | | Nylon fiber | Nylon fiber | Nylon fiber | Nylon fiber | Composite fiber | Nylon fiber | Nylon fiber |
| Evaluation Results | Run-flat durability | 100 | 105 | 106 | 104 | 107 | 102 | 100 |
|  | Riding comfort | 3 | 4.0 | 4.7 | 4.3 | 5.0 | 2.7 | 2.3 |

Notes to Table 1:
"Conv. Ex." is an abbreviation for "Conventional Example", "W.E." is an abbreviation for "Working Example"; and "C.E." is an abbreviation for "Comparative Example".

It is clear from Table 1 that compared to the tires of the Conventional Example and the Comparative Examples, the tires of the Working Examples of the present technology enhance run-flat durability and riding comfort in a well-balanced manner.

What is claimed is:

1. A run flat tire comprising at least one layer of a carcass layer provided around bead cores embedded in a left-right pair of bead portions and folded over from a tire inner side toward a tire outer side so as to envelop bead fillers that are disposed on an outer circumferential side of the bead cores, wherein a plurality of belt layers is disposed on an outer circumferential side of the carcass layer in a tread portion, a belt cover layer is disposed on the outer circumferential side of the belt layers, and a rubber side reinforcing layer having a falcated cross-section is disposed between the carcass layer and an inner liner layer of a side wall portion; wherein when Ga is a rubber thickness measured on a line normal to the rim line at an outer wall surface of the bead portion, between the carcass layer and an outer wall surface of the side wall portion, and Gb is a maximum rubber thickness measured on a line normal to the carcass layer between the carcass layer and the outer wall surface of the side wall portion, a relationship between Ga and Gb is $0.65Gb<Ga<0.85Gb$; and when Gc is a rubber thickness measured on a line normal to the rim line between the carcass layer and a tire inner wall surface, a relationship between Gc and Ga is $0.85Ga<Gc<1.00Ga$; and a rubber rim cushion is provided on the outer wall surface side of the bead portion and a rubber side filler is embedded in the outer wall surface side of the side wall portion, extending in a tire radial direction, having a maximum thickness at a position where the rubber thickness between the carcass layer and the outer wall surface of the side wall portion is greatest, and gradually thinning vertically in the tire radial direction;

a relationship between a 100% modulus Ms of the rubber forming the rubber side filler and a 100% modulus M of the rubber forming the rubber side reinforcing layer is such that $0.7M \leq Ms \leq 1.0M$; a relationship between a 100% modulus Mc of the rubber forming the rubber rim cushion and a 100% modulus Ms of the rubber forming the rubber side filler is such that $0.7Ms \leq Mc \leq 1.3Ms$; a relationship between a cross-sectional area Df of the bead filler and a cross-sectional area Ds of the rubber side filler is such that $Df \leq 0.4Ds$; and a relationship between the cross-sectional area Ds of the rubber side filler and a cross-sectional area D of the rubber side reinforcing layer is such that $0.2D \leq Ds \leq 0.6D$.

2. The run flat tire according to claim 1, wherein the rubber side reinforcing layer having a falcated cross-section is formed from an inner side rubber and an outer side rubber that are connected in the tire radial direction, and the inner side rubber of the rubber forming the rubber side reinforcing layer has a higher JIS-A hardness than the outer side rubber, a relationship between Ms and the inner side rubber 100% modulus Mi is such that $0.7Mi \leq Ms \leq 1.0Mi$ and a relationship between Ms and the outer side rubber 100% modulus Mo is such that $0.7Mo \leq Ms \leq 1.0Mo$.

3. The run flat tire according to claim 2, wherein the belt cover layer comprises a composite fiber cord that is formed by twisting a low elasticity yarn and a high elasticity yarn having differing elastic moduli together.

4. The run flat tire according to claim 1, wherein the belt cover layer comprises a composite fiber cord that is formed by twisting a low elasticity yarn and a high elasticity yarn having differing elastic moduli together.

5. The run flat tire according to claim 1, wherein the relationship between Ga and Gb is $0.70Gb<Ga<0.80Gb$.

6. The run flat tire according to claim 1, wherein the relationship between Gc and Ga is $0.90Ga<Gc<0.95Ga$.

7. The run flat tire according to claim 1, wherein the relationship between Ga and Gb is $0.70Gb<Ga<0.80Gb$; and the relationship between Gc and Ga is $0.90Ga<Gc<0.95Ga$.

8. The run flat tire according to claim 1, wherein an outer peripheral edge of the bead filler is disposed inward in the tire radial direction of a line normal to a rim line of an outer wall surface of the bead portion.

9. The run flat tire according to claim 1, wherein a second carcass layer is disposed on the outer circumferential side of the carcass layer in the width direction of the tread portion, and an end of the second carcass layer is positioned on the tire inner wall surface side of the bead filler.

10. The run flat tire according to claim 9, wherein the second carcass layer is disposed along an outer peripheral surface of the carcass layer and the end of the second carcass layer does not reach an outer peripheral surface of the bead core.

11. The run flat tire according to claim 1, wherein the rubber side reinforcing layer having a falcated cross-section is formed from an inner side rubber and an outer side rubber that are continuous in the tire radial direction, a relationship between Ms and the inner side rubber 100% modulus Mi is such that $0.7Mi \leq Ms \leq 1.0Mi$ and a relationship between Ms and the outer side rubber 100% modulus Mo is such that $0.7Mo \leq Ms \leq 1.0Mo$.

\* \* \* \* \*